2,894,019
PHOSPHORUS COMPOUNDS

Arthur Maeder, Therwil, Bl, Switzerland, assignor to Ciba Limited, Basel, Switzerland, a Swiss firm No Drawing. Application January 27, 1958
Serial No. 711,124

Claims priority, application Switzerland
February 15, 1957

4 Claims. (Cl. 260—461)

The present invention provides new organic phosphorus compounds which are derived from pentavalent phosphorus and which correspond to the probable general formula

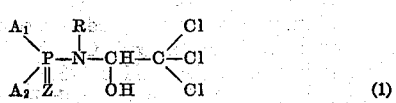
(1)

in which $A_1$ and $A_2$ represent organic radicals which are bound to the phosphorus atom directly or through a heteroatom, R represents a hydrogen atom or a low molecular alkyl group and Z represents an oxygen atom or a sulfur atom.

The new compounds may be prepared by treating an amide of pentavalent phosphorus of the general formula

(2)

in which $A_1$, $A_2$, R and Z have the above meanings, with chloral.

As starting materials of the Formula 2 there come into consideration, for example, esters of amido-phosphoric acids, of amido-thio-phosphoric acids and of amido-dithio-phosphoric acids. These compounds correspond more especially to the general formula

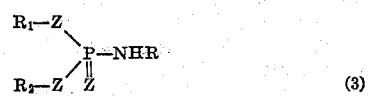
(3)

in which $R_1$ and $R_2$ each represent an aliphatic, cycloaliphatic, araliphatic, aromatic or heterocyclic radical, R represents a hydrogen atom or a lower alkyl group, and Z represents a sulfur atom or an oxygen atom. There may be mentioned as examples:

O:O'-diethyl-amidophosphate,
O:O'-di-(β-chlorethyl)-amidophosphate,
O:O'-Diisopropyl-amidophosphate,
O:O'-Dibenzyl-amidophosphate,
O:O-Dibenzylhydrylamidophosphate,
O-Ethyl-O-phenyl-amidophosphate,
O:O'-Diphenylamidophosphate,
O:O'-Di-(p-chlorophenyl)-amidophophate,
O:O'-Di-(β-naphthyl)-amidophopshate,
O:O'-Diphenyl-amidothionophosphate,
O:O'-Di-(4-methylphenyl)-amidothionophosphate,
O:O'-Di-(β-naphthyl)-amidothionophosphate,
O:O'-Diethyl-N-methyl-amidophosphate,
O:O'-Diphenyl-N-methyl-amidophosphate,
O:O'-Diethyl-N-ethyl-amidophosphate,
O:O'-Diethyl-N-propyl-amidophosphate,
O:O'-Diethyl-N-isobutyl-amidophosphate,
O:O'-Diethyl-N-ethyl-amidothionophosphate,
O:O'-Diphenyl-N-ethyl-amidothionophosphate.

There also come into consideration esters of diamido phosphoric acids, especially those of the general formula

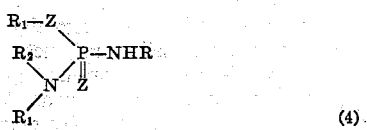
(4)

in which $R_1$, $R_2$ and Z have the same meanings as in the Formula 3 and R and R' represent a hydrogen atom or a lower alkyl group. There may be mentioned as examples O-phenyl-N:N'-dimethyl-diamidophosphate and O-ethyl-N:N'-dipropyl-diamidophosphate.

Furthermore, there come into consideration N-substituted triamides of phosphoric and thiophosphoric acids, especially those of the formula

(5)

in which $R_1$, $R_2$ and Z, have the same meanings as in Formula 3, and $R_1$, R' and R'' represent a hydrogen atom or a lower alkyl group. There may be mentioned as examples:

N:N':N''-triethyl-thionophosphoric acid triamide,
N:N':N''-tripropyl-phosphoric acid triamide,
N:N':N''-triisobutyl-phosphoric acid triamide,
N-ethyl-N:N''-diisobutyl-thiophosphoric acid triamide and
N-ethyl-N:N''-diphenylphosphoric acid triamide.

There also come into consideration for use in the process of the invention esters of amido-phosphonic acids and of amido-thiophosphonic acids, especially those of the general formula

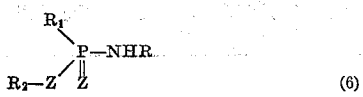
(6)

in which $R_1$, $R_2$, R and Z have the same meanings as in Formula 3; there may be mentioned 4-methyl phenyl-O-phenyl-amido-phosphonate. Instead of the mono-amido compounds there may also be used the corresponding N-substituted phosphonic acid diamides or thiophosphonic acid diamides.

Finally there come into consideration amides of phosphinic acids and of thiophosphinic acids especially of the general formula

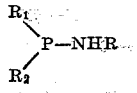

in which $R_1$, $R_2$, R and Z have the same meanings as in Formula 3. There may be mentioned by way of examples di-(4-methylphenyl)-thionophosphinic acid amide.

The reaction between the components may advantageously be carried out with the use of equimolecular proportions. The components may be mixed directly or the reaction may be carried out in the presence of inert solvents as, for example, aliphatic or aromatic hydrocarbons or their halogen-derivatives for example, benzene, toluene, hexane, chlorobenzene, chloroform or carbon tetrachloride. Further, there may be used as solvents ether-like compounds as, for example, dioxane, or tetrahydrofurane and finally saturated amides which contain on the amide nitrogen atom no hydrogen atom as, for example, dimethyl formamide. The reaction may advantageously be carried out at moderately raised temperatures, for example, 30 to 100° C., and preferably in the presence of basic catalysts, especially tertiary bases, for example, triethylamine, pyridine and dimethyl aniline.

The new condensation products can probably be denoted as N-(beta-trichloro-alpha-hydroxyethyl)-derivatives of the amide of pentavalent phosphorus used in the condensation and are generally obtained in the form of good crystalline bodies. They may be used for different purposes in industry, for example, as pest-combating agents, flame-protecting agents, textile assistants, plasticisers, lubricant additives and intermediate products.

The following examples illustrate the invention the parts being by weight unless otherwise indicated, and the relationship between parts by weight and parts by volume being the same as that between the kilogram and the liter:

Example 1

22.2 parts of O:O'-di-(beta-chlorethyl)-amidophosphate were mixed with 15 parts of chloral with exclusion of moisture. In order to accelerate the condensation reaction there was added to this mixture 0.1 part of triethylamine and the mixture was heated on the water bath for 2½ hours at 65 to 75° C. The crude condensation product (36.2 parts) was now dissolved in 25 parts by volume of methanol and transferred to a separating funnel. Upon addition of water an oil separated, from which 21 parts of the condensation product crystallized at once. The separated crystals, after drying, were recrystallized from 5 times their weight of carbon tetrachloride; they had a melting point of 91–92° C. From the above described methanolic-aqueous mother liquor there separated after standing for several hours a further quantity of the same condensation product in the form of fine, felted, needle aggregates. The product was readily soluble in methanol and ethanol, as well as in ethyl acetate and acetone, but it was only slightly to difficultly soluble in cold benzene and carbon tetrachloride. In the latter solvent the product was soluble at raised temperatures.

The product so obtained had the empirical formula $C_6H_{11}O_4NPCl_5$, and gave the following analysis.

|   | Calculated, percent | Found, percent |
|---|---|---|
| C | 19.51 | 19.63 |
| H | 3.00 | 3.07 |
| N | 3.79 | 3.97 |
| P | 8.39 | 8.21 |
| Cl | 47.49 | 47.88 |

The product had the following probable constitutional formula:

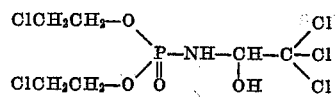

Example 2

12.1 parts of diethyl phosphoric acid amide were heated together with 15.4 parts of anhydrous chloral. The temperature further rose when heating was stopped and was maintained at 70° C. by cooling. When there was no further increase in temperature, the mixture was heated for one hour at 90° C. To the clear solution while it was hot, a mixture of 25 parts by volume of benzene and the same quantity of hexane was added. After cooling, the product was obtained in good yield in the form of colorless crystals which, after being recrystallized from ether or cyclohexane, showed a melting point of 96 to 97° C.

Analysis gave the following values:

|   | Calculated, percent | Found, percent |
|---|---|---|
| C | 23.98 | 23.89 |
| H | 4.36 | 4.38 |

The substances had probably the following constitution:

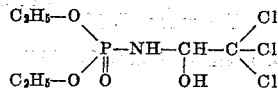

Example 3

15.8 parts of di-(para-chlorophenyl)-phosphoric acid amide, 15 parts by volume of dioxane and 15 parts of anhydrous chloral were dissolved while heating gently. The solution was then heated for one hour at 85° C. and for three hours at 90° C. After distilling off the dioxane in vacuo, the residue (23.0 parts) was dissolved in 100 parts by volume of methylene chloride. After cooling, the condensation product was obtained in the form of fine needles melting at 142–143° C.

The chlorine analysis gave the following values: Cl calculated 38.09%. Found 38.29%.

The substance had probably the following constitution:

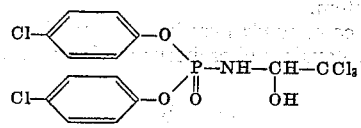

When tomato or celery plants are sprayed with a liquor containing 0.1 percent of the above compound, they are protected against *Alternaria solani*, *Septoria apii* and *Phytophtora infestans*.

Example 4

2 parts of the reaction product from O:O'-di-(beta-chloroethyl)-amidophosphate and chloral, obtained as described in Example 1, were dissolved in 4 parts by volume of ethanol and 2 parts of water were then added. The pH was adjusted to 4 by the addition of a little formic acid, and a solution of 1 part of a condensation product, which had a limited solubility in water, from 1 mol of melamine and about 3 mols of formaldehyde in 1 part of water was added.

With the resulting bath a blue cotton overall-material was impregnated at about 40° C. on a foulard, dried, hardened for 5 minutes at 150° C. and then rinsed. The fabric so treated showed very good non-smouldering properties and resistance to flames; the handle was only slightly stiffer and the tint remained unchanged.

What is claimed is:

1. The compound of the formula

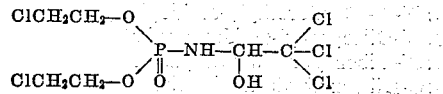

2. The compound of the formula

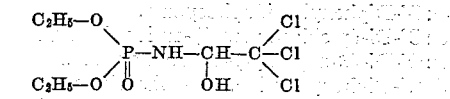

3. The compound of the formula

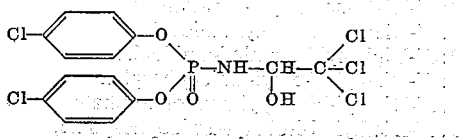

4. An organic phosphorus compound of the formula
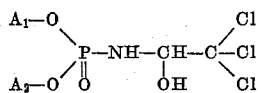
in which $A_1$ and $A_2$ each represents a member selected from the group consisting of lower aliphatic radicals and aromatic radicals with a single 6-membered ring.
No references cited.

UNITED STATES PATENT OFFICE
Certificate of Correction

July 7, 1959

Patent No. 2,894,019

Arthur Maeder

It is hereby certified that error appears in the printed specification of the above numbered patent requiring correction and that the said Letters Patent should read as corrected below.

Column 2, lines 60 to 63, the formula should appear as shown below instead of as in the patent:

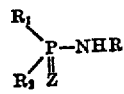

Signed and sealed this 15th day of December 1959.

[SEAL]

Attest:
KARL H. AXLINE,
*Attesting Officer.*

ROBERT C. WATSON,
*Commissioner of Patents.*